United States Patent
Siriwardane et al.

(10) Patent No.: US 9,557,053 B1
(45) Date of Patent: Jan. 31, 2017

(54) METAL FERRITE OXYGEN CARRIERS FOR CHEMICAL LOOPING COMBUSTION OF SOLID FUELS

(71) Applicants: Ranjani V. Siriwardane, Morgantown, WV (US); Yueying Fan, Morgantown, WV (US)

(72) Inventors: Ranjani V. Siriwardane, Morgantown, WV (US); Yueying Fan, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 713 days.

(21) Appl. No.: 14/032,628

(22) Filed: Sep. 20, 2013

(51) Int. Cl.
*F23C 13/08* (2006.01)
*F23C 10/01* (2006.01)
(Continued)

(52) U.S. Cl.
CPC ............. *F23C 13/08* (2013.01); *B01J 21/20* (2013.01); *B01J 23/00* (2013.01); *B01J 23/002* (2013.01);
(Continued)

(58) Field of Classification Search
CPC ............. F23B 7/00; F23C 10/01; F23C 13/08; B01J 21/20; B01J 23/002; B01J 23/00; C01B 3/386; C01B 13/0203
(Continued)

(56) References Cited

U.S. PATENT DOCUMENTS

| 7,824,655 B2 | 11/2010 | Slager et al. |
| 8,397,508 B2 * | 3/2013 | Weimer .................. C01B 3/042 423/418.2 |
| 2008/0164443 A1 * | 7/2008 | White .................... B01J 23/002 252/373 |

OTHER PUBLICATIONS

Jin et al., "Development of a Novel Chemical-Looping Combustion: Synthesis of a Solid Looping Material of NiO/NiAl2O4," Ind. Eng. Chem. Res. 38 (1999).
(Continued)

*Primary Examiner* — William G Corboy
(74) *Attorney, Agent, or Firm* — Timothy L. Harney; Daniel D. Park; Brian J. Lally (57) ABSTRACT

The disclosure provides a metal ferrite oxygen carrier for the chemical looping combustion of solid carbonaceous fuels, such as coal, coke, coal and biomass char, and the like. The metal ferrite oxygen carrier comprises $MFe_xO_y$ on an inert support, where $MFe_xO_y$ is a chemical composition and M is one of Mg, Ca, Sr, Ba, Co, Mn, and combinations thereof. For example, $MFe_xO_y$ may be one of $MgFe_2O_4$, $CaFe_2O_4$, $SrFe_2O_4$, $BaFe_2O_4$, $CoFe_2O_4$, $MnFeO_3$, and combinations thereof. The $MFe_xO_y$ is supported on an inert support. The inert support disperses the $MFe_xO_y$ oxides to avoid agglomeration and improve performance stability. In an embodiment, the inert support comprises from about 5 wt. % to about 60 wt. % of the metal ferrite oxygen carrier and the $MFe_xO_y$ comprises at least 30 wt. % of the metal ferrite oxygen carrier. The metal ferrite oxygen carriers disclosed display improved reduction rates over $Fe_2O_3$, and improved oxidation rates over CuO.

14 Claims, 9 Drawing Sheets

(51) Int. Cl.
  *F23C 10/04* (2006.01)
  *F23B 30/00* (2006.01)
  *B01J 23/00* (2006.01)
  *C01B 13/02* (2006.01)
  *B01J 21/20* (2006.01)
(52) U.S. Cl.
  CPC ............. *C01B 13/0203* (2013.01); *F23B 7/00* (2013.01); *F23C 10/01* (2013.01); *F23C 10/04* (2013.01)
(58) Field of Classification Search
  USPC .......................................................... 431/7
  See application file for complete search history.

(56) References Cited

OTHER PUBLICATIONS

Roux et al., "Study and Improvement of the Regeneration of Metallic Oxides Used as Oxygen Carriers f or a New Combustion Process," International Journal of Chemical Reactor Engineering, vol. 4, Art. A38 (2006).
Shulman et al., "Manganese/Iron, Manganese/Nickel, and Manganese/Silicon Oxides Used in Chemical-Looping With Oxygen Uncoupling (CLOU) for Combustion of Methane," Energy Fuels 23 (2009).
Wang et al., "Investigation of Chemical Looping Combustion of Coal with CuFe2O4 Oxygen Carrier," Energy Fuels 25 (2011).
Siriwardane et al., "Evaluation of reaction mechanism of coal—metal oxide interactions in chemical-looping combustion," Combustion and Flame 157 (2010).

* cited by examiner

METAL FERRITE OXYGEN CARRIERS FOR CHEMICAL LOOPING COMBUSTION OF SOLID FUELS

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure provides a metal ferrite oxygen carrier for the chemical looping combustion of solid carbonaceous fuels, such as coal, coke, coal and biomass char, and the like. The metal ferrite oxygen carrier comprises $MFe_xO_y$ on an inert support, where $MFe_xO_y$ is a chemical composition and M is one of Mg, Ca, Sr, Ba, Co, Mn, and combinations thereof.

BACKGROUND

In certain applications metal-oxide oxygen carriers are utilized for the delivery of oxygen via reduction. One such application which has been investigated extensively is chemical looping combustion. Chemical looping combustion systems generally utilize a fuel reactor, an air reactor, and a metal oxide oxygen carrier undergoing reduction in the fuel reactor and oxidation in the air reactor. The reduction in the fuel reactor is facilitated by close contact between a fuel and the oxygen carrier. The subsequent oxidation of the carrier in the air reactor is an exothermic process, and a stream of $N_2$ is exhausted from the air reactor and carries the heat of oxidation to an attached power generation island.

Chemical looping combustion cycles provide potentially significant advantages. The enhanced reversibility of the two redox reactions offers improved efficiencies over traditional single stage combustions, where the release of a fuel's energy occurs in a highly irreversible manner. Further, with appropriate oxygen carriers, both redox reactions can occur at relatively low temperatures, allowing a power station to more closely approach an ideal work output without exposing components to excessive working temperatures. Additionally, and significantly, chemical looping combustion can serve as an effective carbon capture technique. Of the two flue gas streams generated, one is comprised of atmospheric $N_2$ and residual $O_2$, but sensibly free of $CO_2$, while the second stream is comprised of $CO_2$ and $H_2O$, and contains almost all of the $CO_2$ generated by the system. It is relatively uncomplicated to remove the water vapor, leading to a stream of almost pure $CO_2$. For these reasons, chemical looping combustion systems have been extensively investigated. However, necessary characteristics of the oxygen carrier such as sufficient durability and reactivity have limited the success, particularly when the fuel utilized has been introduced to the fuel reactor as a solid such as carbon, coal, or biomass.

Challenges associated with the chemical looping combustion of solid carbonaceous fuels include achieving sufficient combustion rates suitable for various reactor systems, sufficient oxygen release capacity facilitating the coal-oxygen carrier interactions, stable reactivity during multiple cycles, high attrition resistance, and low reactivity with ash and other contaminants. Additional issues arise when the solid carbonaceous fuel is introduced directly into a fuel reactor, without benefit of an initial gasification. Introduction of the solid carbonaceous fuel into the fuel reactor can generate a direct reduction of the oxygen carrier by carbon, and the combustion of solid carbonaceous fuels containing or subsequently generating significant amounts of a solid carbon component such as char is dramatically improved when an oxygen carrier capable of reduction from a solid-solid reaction with carbon is utilized. See e.g., Siriwardane et al., "Evaluation of reaction mechanism of coal-metal-oxide interactions in chemical looping combustion," *Combustion and Flame* 157 (2010). Additionally, a significant concern may arise regarding mismatch between any gasifications within the reactor and the combustion rate at the same temperature. Such issues can prolong the residence time of coal inside the fuel reactor to fulfill the higher carbon conversion efficiency.

A variety of metal oxides have been evaluated for suitability as oxygen carriers in chemical looping combustion systems using solid fuels. Metal oxides based on Ni, Fe, Co, Cu and Mn have a good affinity with CO and are thermodynamically feasible as oxygen carriers, however, $Mn_2O_3$, $Co_3O_4$ and CuO decompose at relatively low temperatures. CuO has also been extensively investigated, but the low melting point and agglomeration issues introduce significant difficulties. $Fe_2O_3$ generally exhibits improved temperature stability, however the reactivity of $Fe_2O_3$ is significantly limited as compared to Cu-based oxygen carriers. Additionally, $Fe_2O_3$ requires relatively high temperatures as compared to CuO. These characteristics reduce overall system performance and increase the complexity of heat transfer requirements in a working system. Mixed systems have also been evaluated for solid fuels combustion in an attempt to optimize the characteristics of the individual constituents. See e.g., Wang et al., "Investigation of Chemical Looping Combustion of Coal with $CuFe_2O_4$ Oxygen Carrier," *Energy Fuels* 25 (2011); see also U.S. patent application Ser. No. 13/159,553 by Siriwardane et al., filed Jun. 14, 2011. Iron (Fe) and manganese (Mn) compounds have also been investigated as oxygen carriers. See Shulman et al., "Manganese/Iron, Manganese/Nickel, and Manganese/Silicon Oxides Used in Chemical-Looping With Oxygen Uncoupling (CLOU) for Combustion of Methane," *Energy Fuels* 23 (2009).

It would be advantageous to provide a metal ferrite oxygen carrier having improved durability and reactivity over metal oxides currently used in the chemical looping combustion of solid carbonaceous fuels, such as coal, coke, coal and biomass char, and the like. It would be additionally advantageous if the metal ferrite oxygen carriers exhibited improved reduction rates over typically used materials such as $Fe_2O_3$, and were comparable with CuO while avoiding the associated agglomeration issues. It would be particularly advantageous if the metal ferrite oxygen carriers were comparable in cost to $Fe_2O_3$ and could be prepared using readily available materials.

These and other objects, aspects, and advantages of the present disclosure will become better understood with reference to the accompanying description and claims.

SUMMARY

The disclosure provides a metal ferrite oxygen carrier having improved durability and reactivity over metal oxides currently used in the chemical looping combustion of solid carbonaceous fuels, such as coal, coke, coal and biomass char, and the like. The metal ferrite oxygen carrier comprises $MFe_xO_y$ on an inert support, where $MFe_xO_y$ is a chemical composition and M is one of Mg, Ca, Sr, Ba, Co, Mn, and combinations thereof. For example, $MFe_xO_y$ may be one of $MgFe_2O_4$, $CaFe_2O_4$, $SrFe_2O_4$, $BaFe_2O_4$, $CoFe_2O_4$, $MnFeO_3$, and combinations thereof.

The $MFe_xO_y$ is supported on an inert support. The inert support disperses the $MFe_xO_y$ oxides to avoid agglomeration and improve performance stability. In an embodiment, the inert support comprises from about 5 weight percent (wt. %) to about 60 wt. % of the metal ferrite oxygen carrier and the $MFe_xO_y$ comprises at least 30 wt. % of the metal ferrite oxygen carrier.

The metal ferrite oxygen carrier may be utilized for the combustion of a solid carbonaceous fuel by delivering the metal ferrite oxygen carrier to a fuel reactor and mixing the solid carbonaceous fuel and the metal ferrite oxygen carrier at a reducing temperature, such that some portion of the metal ferrite oxygen carrier is reduced and some portion of the solid carbonaceous fuel is oxidized. Within the fuel reactor, the metal ferrite oxygen carrier interacts with the solid carbonaceous fuel and generates a reduced carrier comprising an M component and an $Fe_cO_d$ component. The M component comprises some portion of the M comprising the $MFe_xO_y$, and the $Fe_cO_d$ component comprises some portion of the Fe comprising the $MFe_xO_y$, with $c>0$ and $d≥0$. For example, the $Fe_cO_d$ component may be Fe or may be an iron oxide such as FeO, $Fe_2O_3$, and $Fe_3O_4$, among others. In an embodiment, the $Fe_cO_d$ component is $FeO_t$, where $0≤t≤1.5$. In an additional embodiment, the reducing and oxidizing temperatures are from about 800° C. to about 1200° C.

The metal ferrite oxygen carriers exhibit improved reduction rates over typically used materials such as $Fe_2O_3$, and are comparable with CuO while avoiding the associated agglomeration issues. The metal ferrite oxygen carriers are comparable in cost to $Fe_2O_3$ and can be prepared using readily available materials.

Embodiments of the metal ferrite oxygen carriers disclosed are further demonstrated and described in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide process for chemical looping combustion of a solid carbonaceous fuel utilizing a metal ferrite oxygen carrier which comprises $MFe_xO_y$ on an inert support, where $MFe_xO_y$ is a chemical composition and M is one of Mg, Ca, Sr, Ba, Co, Mn, and combinations thereof.

The disclosure provides a metal ferrite oxygen carrier having improved durability and reactivity over metal oxides currently used in the chemical looping combustion of solid carbonaceous fuels, such as coal, coke, coal and biomass char, and the like. The metal ferrite oxygen carrier comprises $MFe_xO_y$ on an inert support, where $MFe_xO_y$ is a chemical composition and M is one of Mg, Ca, Sr, Ba, Co, Mn, and combinations thereof. In an embodiment, the $MFe_xO_y$ is one of $MFe_uO_v$, $MFe_wO_z$, and combinations thereof, where $1.5≤u≤2.5$, $3.5≤v≤4.5$, $1.5≤w≤2.5$, and $2.5≤z≤3.5$. For example, $MFe_xO_y$ may be one of $MgFe_2O_4$, $CaFe_2O_4$, $SrFe_2O_4$, $BaFe_2O_4$, $CoFe_2O_4$, $MnFeO_3$, and combinations thereof. The metal ferrite oxygen carrier thereby comprises a metal ferrite ($MFe_2O_4$) with M selected from Group II elements Mg, Ca, Sr, and Ba and transition metal ferrites $CoFe_2O_4$ and $MnFeO_3$.

The group II metal ferrites showed better performance for solid fuel chemical looping combustion than that with transition metal ferrites. The group II elements may promote the oxygen release of $Fe_2O_3$ which cause higher reduction rate. The incorporation of group II elements in $Fe_2O_3$ decreased agglomeration of reduced state of Fe which lead to durable performance.

The inert support disperses the $MFe_xO_y$ oxides to avoid agglomeration and improve the performance stability of the metal ferrite oxygen carriers. The inert support material does not participate in the oxidation and reduction reactions of the $MFe_xO_y$ comprising the metal ferrite oxygen carrier. In an embodiment, the inert support comprises from about 5 wt. % to about 60 wt. % of the metal ferrite oxygen carrier and the $MFe_xO_y$ comprises at least 30 wt. % of the metal ferrite oxygen carrier. The metal ferrite oxygen carrier is effective for use as an oxygen carrier in chemical looping combustion applications for the combustion of solid carbonaceous fuels, as well as other applications where the transport of oxygen is facilitated through the reduction and subsequent re-oxidation of an oxygen carrier.

Figure 1:
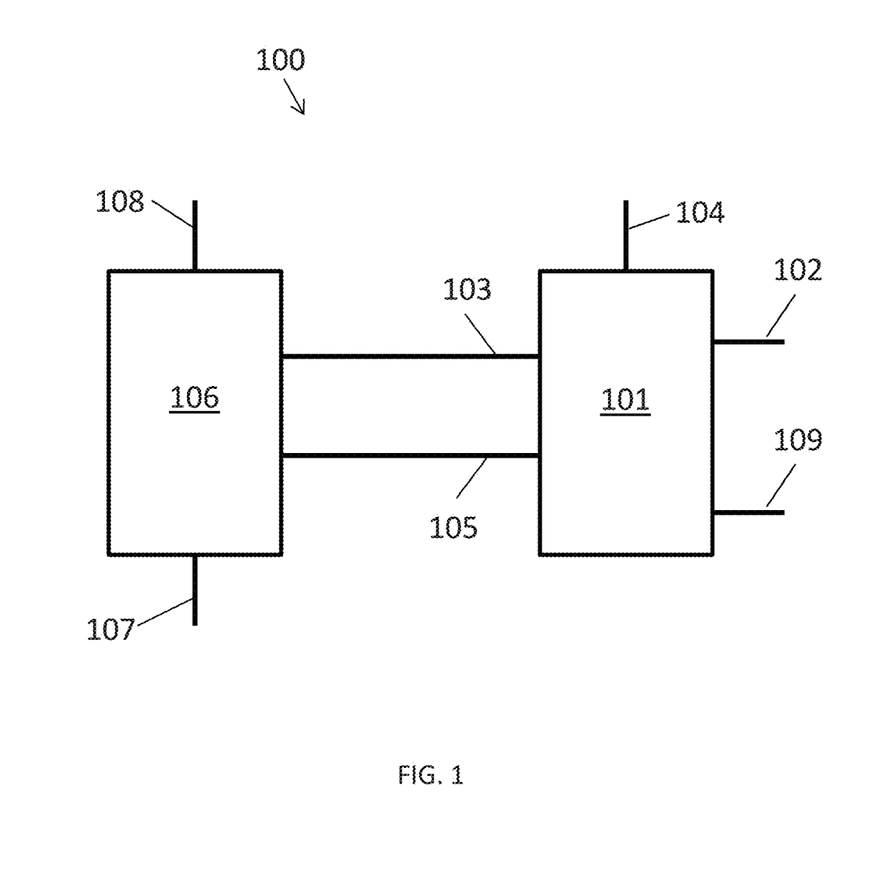
FIG. 1 illustrates a chemical looping combustion process utilizing an metal ferrite oxygen carrier.

A chemical looping combustion system within which the metal ferrite oxygen carrier disclosed here may be utilized is illustrated at FIG. 1. FIG. 1 illustrates a chemical combustion system generally at 100 and includes fuel reactor 101. Fuel reactor 101 receives a fuel flow of solid carbonaceous fuel at 102 and the metal ferrite oxygen carrier at 103, and provides mixing among the solid carbonaceous fuel and the metal ferrite oxygen carrier. Fuel reactor 101 is at a reducing temperature sufficient to reduce at least a portion of the metal ferrite oxygen carrier. In an embodiment, the reducing temperature is from about 800° C. to about 1200° C. In certain embodiments, fuel reactor 101 may also receive a flow of gasification agent at 109, such as steam, $CO_2$, $H_2$, oxygen, and/or air, or any other agent intended to generate gaseous products from the solid carbonaceous fuel within fuel reactor 101.

Within fuel reactor 101, metal ferrite oxygen carrier interacts with carbon and possibly gaseous components from the solid carbonaceous fuel, and the $MFe_xO_y$ comprising the metal ferrite oxygen carrier reduces to a reduced carrier comprising an M component and an $Fe_cO_d$ component. The M component comprises some portion of the M comprising the $MFe_xO_y$. The $Fe_cO_d$ component comprises some portion of the Fe comprising the $MFe_xO_y$, with c>0 and d≥0. For example, the $Fe_cO_d$ component may be Fe or may be an iron oxide such as FeO, Fe2O3, and Fe3O4, among others. In an embodiment, the $Fe_cO_d$ component is $FeO_t$, where 0≤t≤1.5. For example, in an embodiment where the metal ferrite oxygen carrier is $CaFe_2O_4$ on the inert support, the $CaFe_2O_4$ interacts with carbon in fuel reactor 101 and generates a reduced carrier mainly comprising Fe, and FeO. In this embodiment, the M component $CaFe_2O_5$ generated by the reduction comprises some portion of the Ca comprising the $CaFe_2O_4$, and Fe and FeO comprise the $Fe_cO_d$ component $FeO_t$ where 0≤0≤1.5. The $MFe_xO_y$ comprising the metal ferrite oxygen carrier may additionally interact with CO, $H_2$, and other gases which may be present from a gasification of the solid carbonaceous fuel. Following the reduction, an exhaust stream comprised of $CO_2$ and possibly $H_2O$ may exit fuel reactor 101 at exhaust 104, and the reduced carrier may exit fuel reactor 101 at 105.

The reduced carrier exiting fuel reactor 101 at 105 may subsequently enter oxidation reactor 106. Oxidation reactor 106 further receives a flow of oxidizing gas such as air, and facilitates contact between the reduced carrier and the oxidizing gas, generating a re-oxidized carrier. The re-oxidized carrier is generated by an oxidizing reaction, where the reactants of the oxidizing reaction are a portion of the oxygen from the oxidizing gas, the M component comprising the reduced carrier, and the $Fe_cO_d$ component comprising the reduced carrier. The product of the oxidizing reaction is the re-oxidized carrier, where the re-oxidized carrier comprises $MFe_aO_b$ on the inert support. Generally, the $MFe_aO_b$ comprising the re-oxidized carrier is substantially equivalent to the $MFe_xO_y$ comprising the metal ferrite oxygen carrier. For example, when the metal ferrite oxygen carrier comprises $CaFe_2O_4$ on the inert support and the reduced carrier comprises $CaFe_2O_5$, Fe, and FeO, then the oxidation reaction generates a re-oxidized carrier comprising $CaFe_2O_4$ on the inert support. Oxidation reactor 106 is at an oxidation temperature sufficient to oxidize at least a portion of the reduced carrier. In an embodiment, the oxidizing temperature is from about 800° C. to about 1200° C.

Within this disclosure, "reducing" or "reduction" as it applies to a metal ferrite oxygen carrier means the loss of oxygen from the $MFe_xO_y$ comprising the metal ferrite oxygen carrier. For example, the reduction of a $MFe_xO_y$ composition to FeO, $Fe_2O_3$, and/or Fe and an M component, where the M component comprises some portion of the M comprising the $MFe_xO_y$, or alternatively, the reduction of a $MFe_xO_y$ composition to a $MFe_xO_{y-1}$ composition. "Oxidizing" or "oxidation" as it applies to a metal ferrite oxygen carrier means a reaction with oxygen among the FeO, $Fe_2O_3$, and/or Fe and the M component generated by reduction of the $MFe_xO_y$, where the oxidation reaction produces the $MFe_xO_y$, or alternatively, a gain of oxygen by the $MFe_xO_{y-1}$ composition. Similarly, a "reducing temperature" is a temperature sufficient to generate reduction and an "oxidizing temperature" is a temperature sufficient to generate oxidation under other prevailing and germane existing conditions.

Within this disclosure, "solid carbonaceous fuel" means a fuel comprising solid carbon, such as coal, coke, coal and biomass char, and the like. Under the reducing temperature of the fuel reactor and in some embodiments the influence of the gasification agent, the solid carbonaceous fuel may produce volatile gases and other compounds in the fuel reactor. In an embodiment, the solid carbonaceous fuel is at least 50 wt. % fixed carbon. In an additional embodiment, the solid carbonaceous fuel is at least 75 wt. % fixed carbon, and in a further embodiment, the solid carbonaceous fuel is at least 85 wt. % fixed carbon with a volatile matter content of less than 5 wt. %. In another embodiment where the solid carbonaceous fuel is substantially free of volatiles such as petcoke, char, and the like, the solid carbonaceous fuel is at least 90 wt. % fixed carbon. Fixed carbon and volatile matter contents may be determined by means known in the art. See e.g., ASTM Standard—Vol. 05.06 Gaseous Fuels, Coal and Coke, ASTM International (2013).

Within this disclosure, "mixing" as it pertains to a metal ferrite oxygen carrier and a solid carbonaceous fuel means bringing the metal ferrite oxygen carrier and the solid carbonaceous fuel and/or some component thereof into sufficient proximity such that the $MFe_xO_y$ comprising the metal ferrite oxygen carrier reduces to a reduced carrier comprising an M component and an $Fe_cO_d$ component at the reducing temperature within the fuel reactor. In an embodiment, mixing means bringing the metal ferrite oxygen carrier and carbon comprising the solid carbonaceous fuel into sufficient proximity such that the metal ferrite oxygen carrier is reduced by a solid-solid reaction with the carbon comprising the solid carbonaceous fuel. See e.g., Siriwardane et al., *Combustion and Flame* 157 (2010).

As stated and as is understood, the metal ferrite oxygen carrier comprising $MFe_xO_y$ on the inert support may also be made up of additional components. In an embodiment, the $MFe_xO_y$ on the inert support comprises at least 10 wt. % of the metal ferrite oxygen carrier. In another embodiment, the $MFe_xO_y$ on the inert support comprises at least 25 wt. % of the metal ferrite oxygen carrier, and in a further embodiment, the $MFe_xO_y$ on the inert support comprises at least 50 wt. % of the metal ferrite oxygen carrier. In an additional embodiment, an oxygen carrier comprises a plurality of reducing components where each component in the plurality undergoes a reduction reaction in contact with the solid carbonaceous fuel, and the metal ferrite oxygen carrier comprises at least 10 wt. %, at least 25 wt. %, or at least 50 wt. % of the plurality of reducing components.

Additionally, in an embodiment, the metal ferrite oxygen carrier is a plurality of oxygen carrier pellets where each oxygen carrier pellet in the plurality comprises the $MFe_xO_y$ on the inert support. In an additional embodiment, a Sauter mean diameter of the plurality of oxygen carrier pellets is less than about 200 micron (μm), preferably less than about 100 μm. In a further embodiment, the solid carbonaceous fuel is a plurality of fuel pellets, and a Sauter mean diameter of the plurality of fuel pellets is less than about 200 micron (μm), preferably less than about 100 μm. The Sauter mean diameter may be determined by means known in the art such as sieving, microscopy, sedimentation, permeametry, laser diffraction, or other means, or as reported by a manufacturer of such as-described pellets or the operating instructions of machinery intended to produce such as-described pellets. See e.g., Martin Rhodes, *Introduction to Particle Technology* ($2^{nd}$ ed. 2008). The use of such sized pellets as described can promote solid-solid contact between the metal ferrite oxygen carrier and the solid carbonaceous fuel, enhancing the reaction mechanisms. See e.g., Siriwardane et al., *Combustion and Flame* 157 (2010). When a gasification agent is used for gasifying the solid fuel, the particle size of the carrier pellet may vary depending on the type of reactor bed used. In case of a fluid bed reactor, particle size may be 100-500 μm, while in moving bed applications the particle size may be 1-5 mm.

The oxidizing reaction occurring in oxidation reactor 106 is an exothermic reaction, and heat generated is carried from oxidizing reactor 106 by a gaseous flow exiting at 108. The gaseous flow exiting at 108 is comprised of the oxidizing gas less that oxygen utilized for the generation of the re-oxidized carrier, and may be sent to and utilized by a power generation cycle. For example, when the flow of oxidizing gas is air, the gaseous flow exiting at 108 is comprised of $N_2$ and possibly some remaining $O_2$, and other components. The re-oxidized carrier may be subsequently transported to fuel reactor 101 for use as the metal ferrite oxygen carrier in a cyclic operation.

It is understood that FIG. 1 provides an exemplary application illustrating a chemical looping combustion process with a solid carbonaceous fuel such as coal, coke, coal and biomass char, and the like, however the specifics of the process illustrated are not intended to be limiting. Within this disclosure, it is only necessary that a metal ferrite oxygen carrier be delivered to a fuel reactor, where the metal ferrite oxygen carrier comprises $MFe_xO_y$ on an inert support, and where M is one of Mg, Ca, Sr, Ba, Co, Mn, and combinations thereof, and that the metal ferrite oxygen carrier contact a solid carbonaceous fuel at a reducing temperature sufficient to reduce some portion of the metal ferrite oxygen carrier and oxidize some portion of the solid carbonaceous fuel. An exemplary application is as the metal ferrite oxygen carrier in a chemical looping combustion process combusting a solid carbonaceous fuel or fuels such as coal, coke, coal and biomass char, and the like.

As stated, the metal ferrite oxygen carrier comprises $MFe_xO_y$ on an inert support, where $MFe_xO_y$ is a chemical composition and M is one of Mg, Ca, Sr, Ba, Ni, Co, Mn, and combinations thereof. For example, $MFe_xO_y$ may be one of $MgFe_2O_4$, $CaFe_2O_4$, $SrFe_2O_4$, $BaFe_2O_4$, $NiFe_2O_4$, $CoFe_2O_4$, $MnFeO_3$, and combinations thereof. The inert support does not participate in the oxidation and reduction reactions of the $MFe_xO_y$. In an embodiment, the inert support is alumina ($Al_2O_3$).

The performance of metal ferrite oxygen carriers comprising $MgFe_2O_4$, $SrFe_2O_4$, $CaFe_2O_4$, and $BaFe_2O_4$ on an inert support of $Al_2O_3$ is illustrated at FIGS. 2-7, where the inert support comprises 10 wt. % of the metal ferrite oxygen carrier. At FIGS. 2-7, specific listed constituents generally indicate 2-theta values where peaks indicate the presence of the specific constituent on the 2-theta axis.

X-ray diffraction (XRD) analyses were carried out using a Panalytical PW 3040 X-Pert Pro XRD system equipped with a 60 kV PW 3373/00 Cu LFF high-power ceramic tube with a Cu anode and a PW 3011/20 detector. The X-ray wavelength used was Cu KR-1 at 1.540 56 angstrom. The maximum goniometer resolution was 0.003° (2θ). System calibration was carried out using a polysilicon-pressed disk with the Si<111> referenced to 28.443° (2θ). Sample data were acquired at 40 kV and 45 mA in a line-focus mode using a standard PW3071/60 powder diffraction stage.

Figure 2:
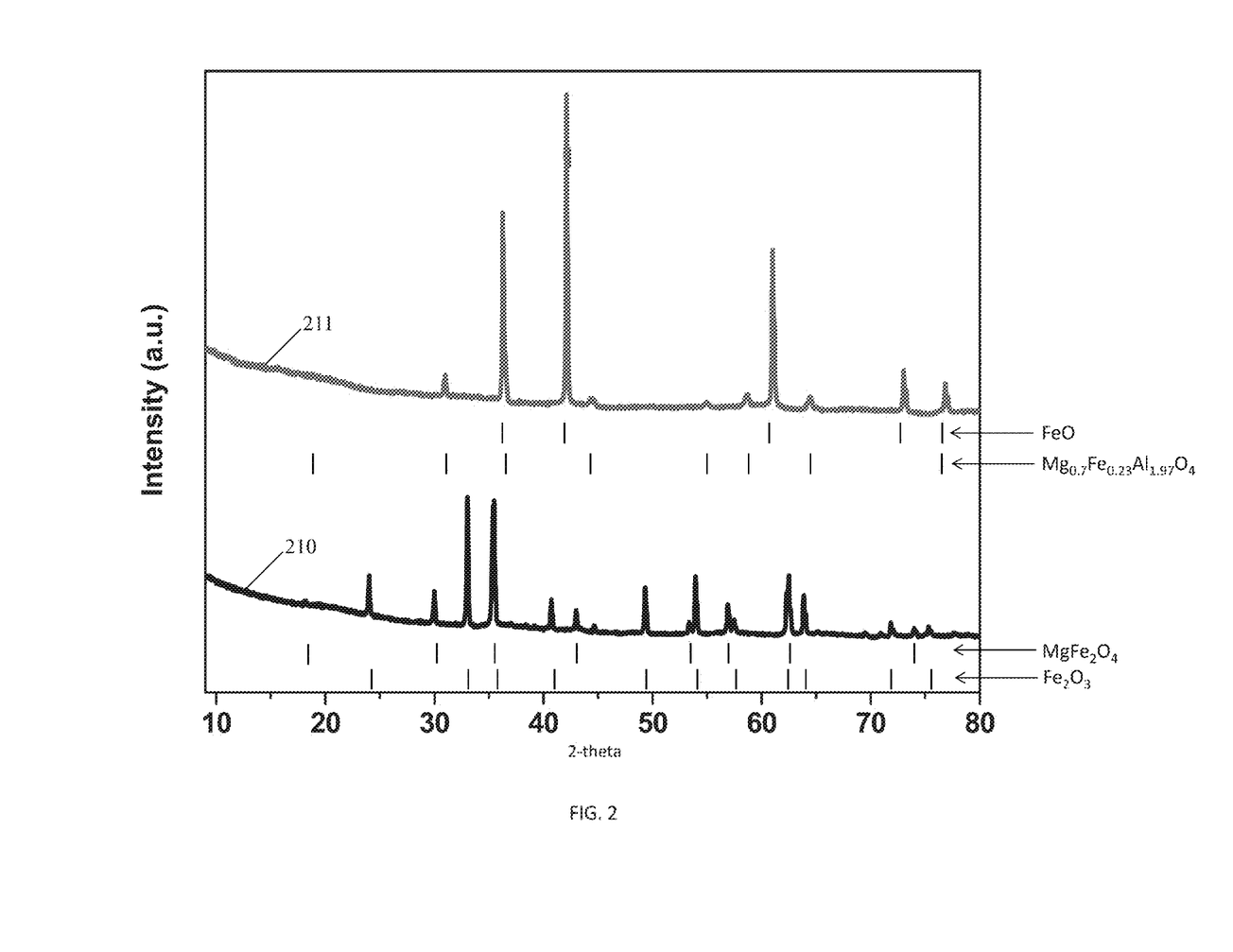
FIG. 2 illustrates XRD results for a metal ferrite oxygen carrier comprising $MgFe_2O_4$.

FIG. 2 illustrates XRD patterns obtained before and following reduction of the $MgFe_2O_4$ metal ferrite oxygen carrier. Trace 210 indicates the XRD pattern of the metal ferrite oxygen carrier comprising $MgFe_2O_4$ prior to reduction. As indicated, prior to reduction, trace 210 indicates the presence of $MgFe_2O_4$ (main) and $Fe_2O_3$, as evidenced by the peaks on trace 210 located at the 2-theta markers generally indicated by $MgFe_2O_4$ and $Fe_2O_3$. Trace 211 indicates the XRD pattern of the metal ferrite oxygen carrier comprising $MgFe_2O_4$ following reduction. Trace 211 indicates the presence of FeO (main) and $Mg_{0.7}Fe_{0.23}Al_{1.97}O_4$ as evidenced by the peaks on trace 211 located at the 2-theta markers generally indicated by FeO and $Mg_{0.7}Fe_{0.23}Al_{1.97}O_4$. FIG. 2 thus illustrates a metal ferrite oxygen carrier $MFe_xO_y$, where M is Mg, reduced to a reduced carrier comprising an M component ($Mg_{0.7}Fe_{0.23}Al_{1.97}O_4$) and an $Fe_cO_d$ component as $FeO_t$ (FeO), where the M component comprises some portion of the M comprising the $MFe_xO_y$, and where $0 \le t \le 1.5$.

Figure 3:
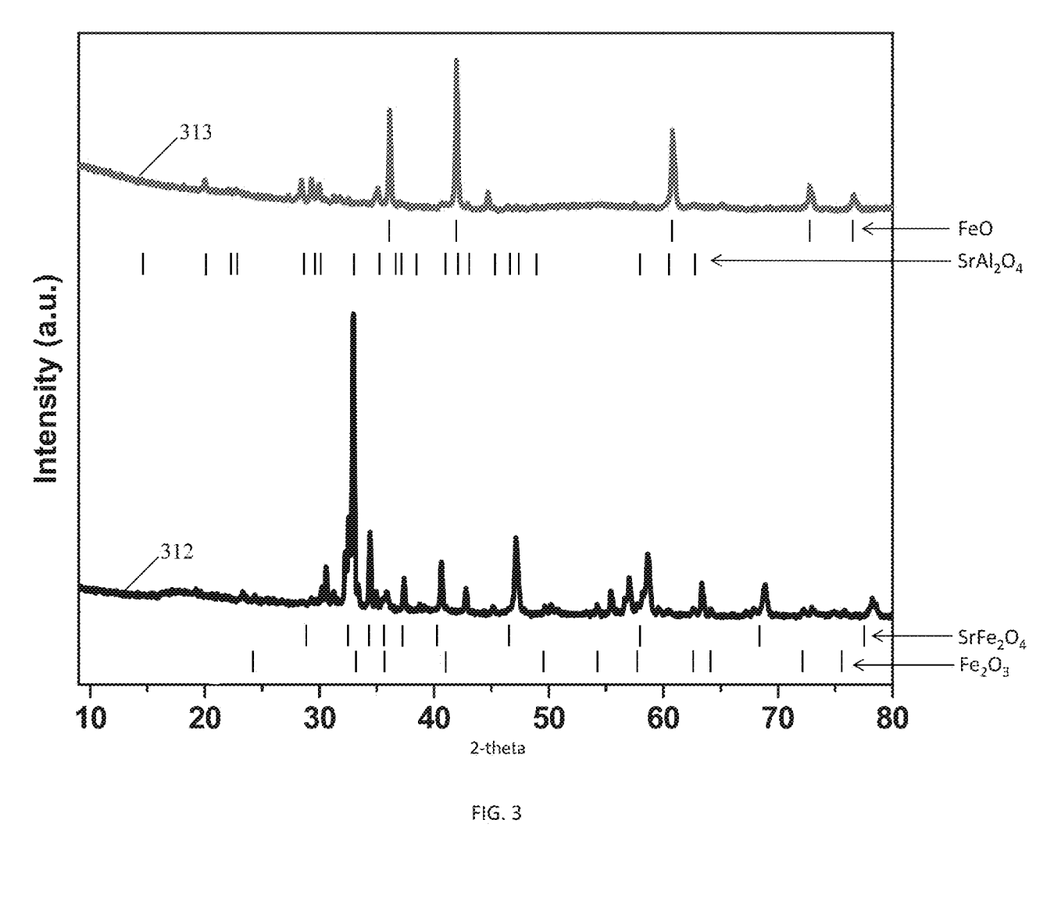
FIG. 3 illustrates XRD results for a metal ferrite oxygen carrier comprising $SrFe_2O_4$.

FIG. 3 illustrates x-ray diffraction (XRD) patterns obtained before and following reduction of the $SrFe_2O_4$ metal ferrite oxygen carrier. Trace 312 indicates the XRD pattern of the metal ferrite oxygen carrier comprising $SrFe_2O_4$ prior to reduction. As indicated, prior to reduction, trace 312 indicates the presence of $SrFe_2O_4$ (main) and $Fe_2O_3$, as evidenced by the peaks on trace 312 located at the 2-theta markers generally indicated by $SrFe_2O_4$ and $Fe_2O_3$. Trace 313 indicates the XRD pattern of the metal ferrite oxygen carrier comprising $SrFe_2O_4$ following reduction. Trace 313 indicates the presence of FeO (main) and $SrAl_2O_4$ as evidenced by the peaks on trace 313 located at the 2-theta markers generally indicated by FeO and $SrAl_2O_4$. FIG. 3 thus illustrates a metal ferrite oxygen carrier $MFe_xO_y$, where M is Sr, reduced to a reduced carrier comprising an M component ($SrAl_2O_4$) and an $Fe_cO_d$ component as $FeO_t$ (FeO), where the M component comprises some portion of the M comprising the $MFe_xO_y$, and where $0 \le t \le 1.5$.

Figure 4:
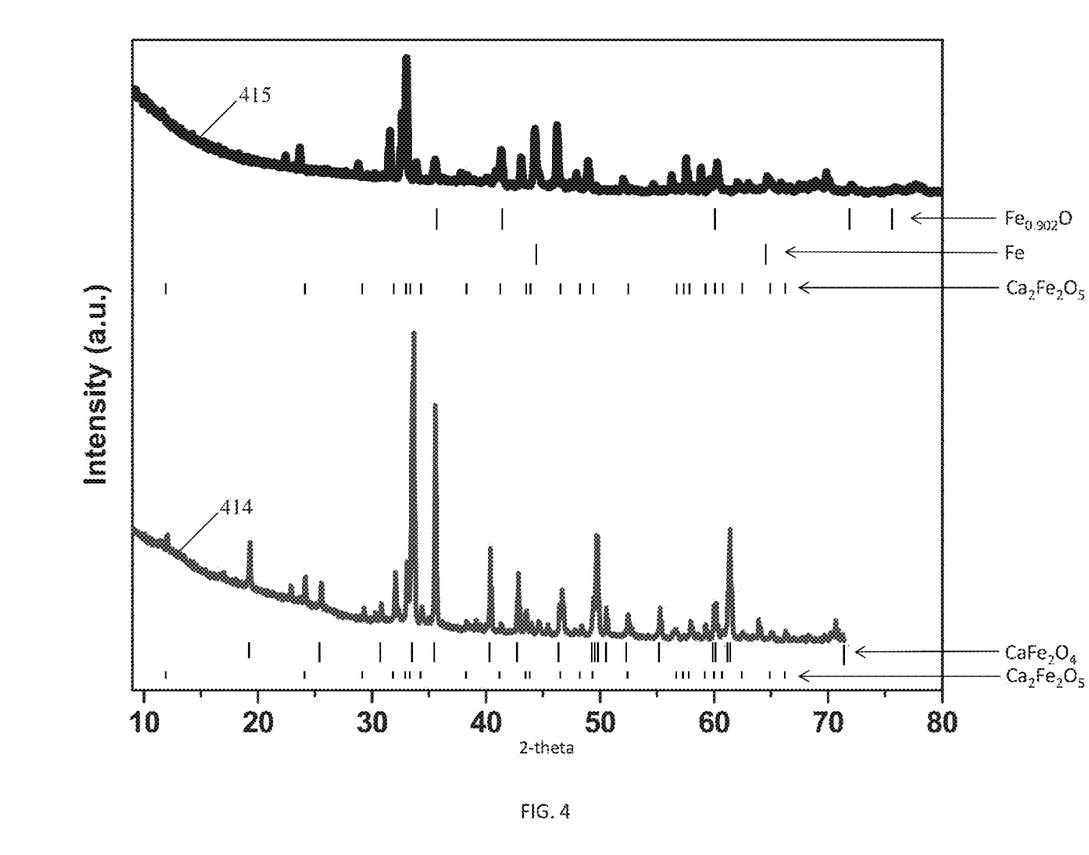
FIG. 4 illustrates XRD results for a metal ferrite oxygen carrier comprising $CaFe_2O_4$.

FIG. 4 illustrates x-ray diffraction (XRD) patterns obtained before and following reduction of the $CaFe_2O_4$ metal ferrite oxygen carrier. Trace 414 indicates the XRD pattern of the metal ferrite oxygen carrier comprising $CaFe_2O_4$ prior to reduction. As indicated, prior to reduction, trace 414 indicates the presence of $CaFe_2O_4$ (main) and $Ca_2Fe_2O_5$, as evidenced by the peaks on trace 414 located at the 2-theta markers generally indicated by $CaFe_2O_4$ and $Ca_2Fe_2O_5$. Trace 415 indicates the XRD pattern of the metal ferrite oxygen carrier comprising $CaFe_2O_4$ following reduction. Trace 415 indicates the presence of $Fe_{0.902}O$ (main), Fe, and $Ca_2Fe_2O_5$ as evidenced by the peaks on trace 415 located at the 2-theta markers generally indicated by $Fe_{0.902}O$, Fe, and $Ca_2Fe_2O_5$. FIG. 4 thus illustrates a metal ferrite oxygen carrier $MFe_xO_y$, where M is Ca, reduced to a reduced carrier comprising an M component ($Ca_2Fe_2O_5$) and an $Fe_cO_d$ component as $FeO_t$ ($Fe_{0.902}O$ and Fe), where the M component comprises some portion of the M comprising the $MFe_xO_y$, and where $0 \le t \le 1.5$.

Figure 5:
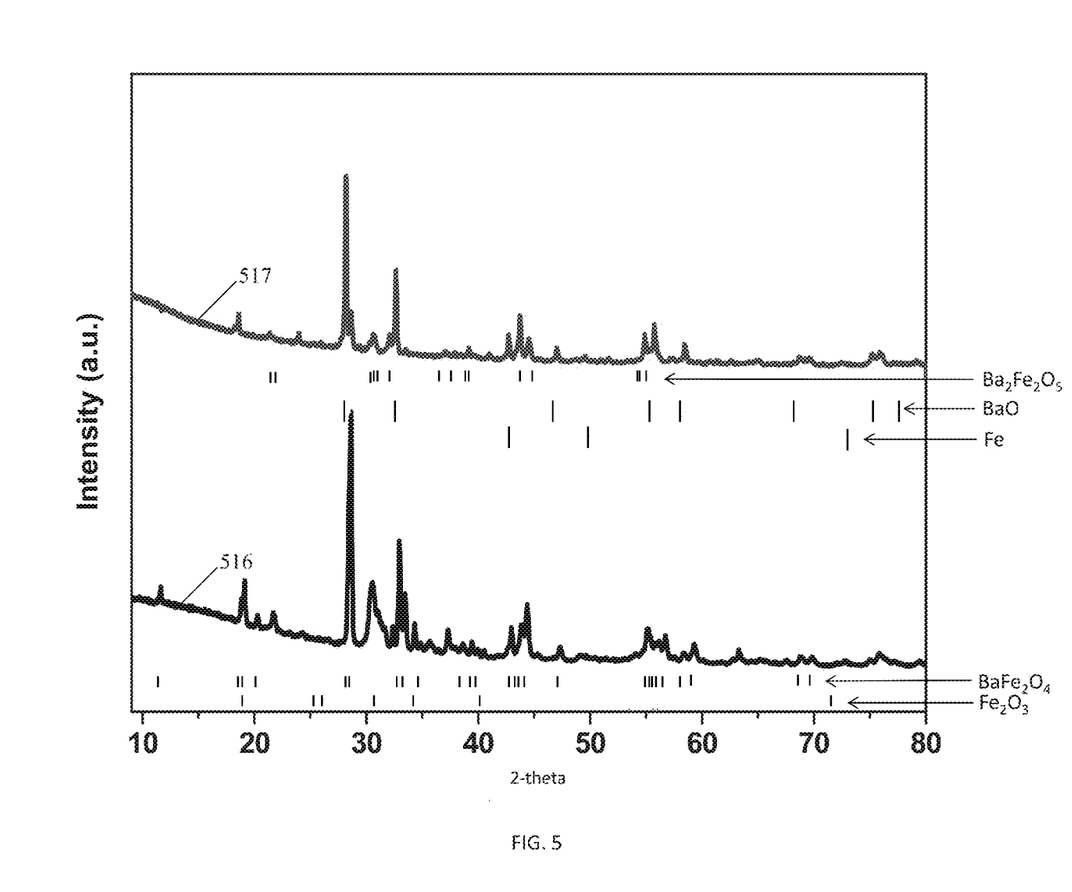
FIG. 5 illustrates XRD results for a metal ferrite oxygen carrier comprising $BaFe_2O_4$.

FIG. 5 illustrates x-ray diffraction (XRD) patterns obtained before and following reduction of the $BaFe_2O_4$ metal ferrite oxygen carrier. Trace 516 indicates the XRD pattern of the metal ferrite oxygen carrier comprising $BaFe_2O_4$ prior to reduction. As indicated, prior to reduction, trace 516 indicates the presence of $BaFe_2O_4$ (main) and $Fe_2O_3$, as evidenced by the peaks on trace 516 located at the 2-theta markers generally indicated by $BaFe_2O_4$ and $Fe_2O_3$. Trace 517 indicates the XRD pattern of the metal ferrite oxygen carrier comprising $BaFe_2O_4$ following reduction. Trace 517 indicates the presence of Fe, BaO, and $Ba_2Fe_2O_5$ as evidenced by the peaks on trace 517 located at the 2-theta markers generally indicated by Fe, BaO, and $Ba_2Fe_2O_5$. FIG. 5 thus illustrates a metal ferrite oxygen carrier $MFe_xO_y$, where M is Ba, reduced to a reduced carrier comprising an M component ($Ba_2Fe_2O_5$ and BaO) and an $Fe_cO_d$ component as $FeO_t$ (Fe), where the M component comprises some portion of the M comprising the $MFe_xO_y$, and where $0 \le t \le 1.5$.

Figure 6:
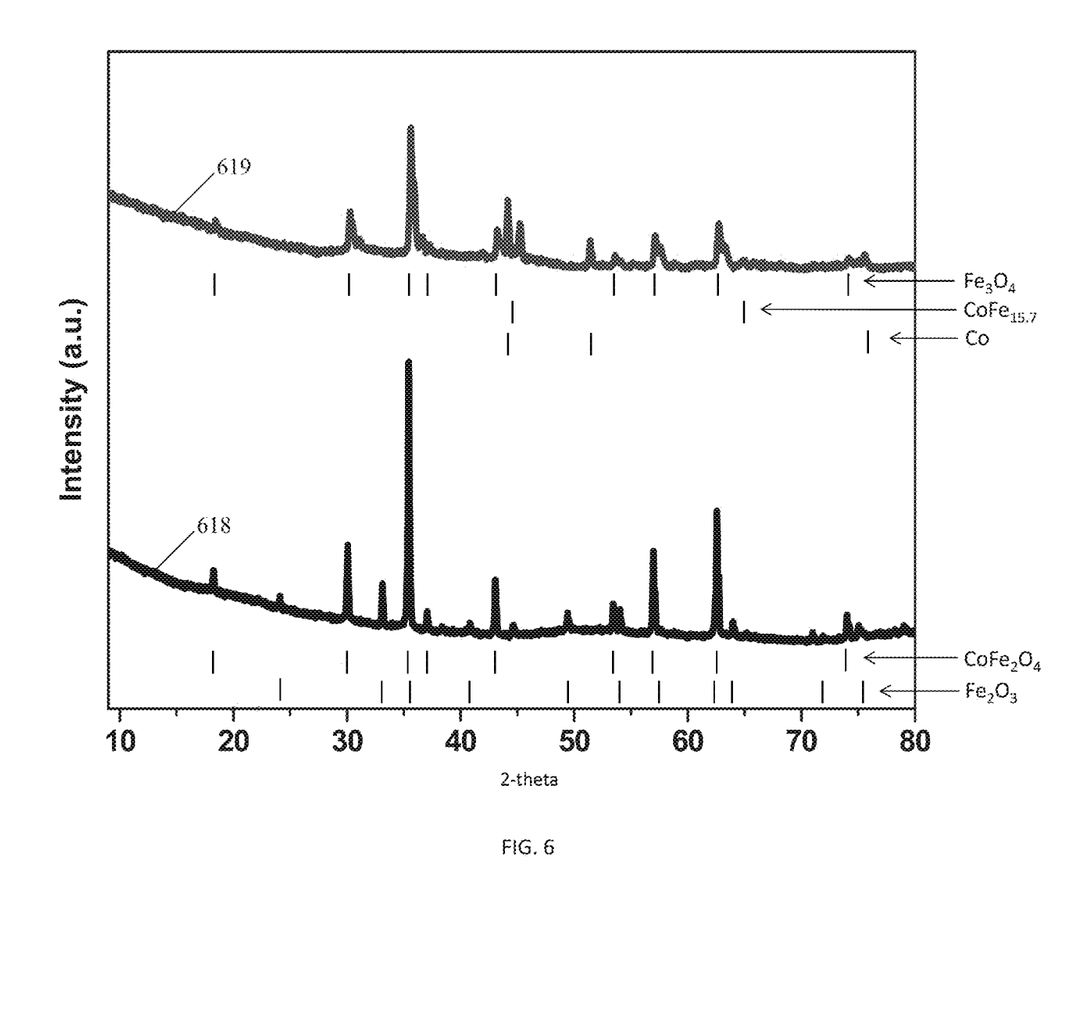
FIG. 6 illustrates XRD results for a metal ferrite oxygen carrier comprising $CoFe_2O_4$.

FIG. 6 illustrates x-ray diffraction (XRD) patterns obtained before and following reduction of the $CoFe_2O_4$ metal ferrite oxygen carrier. Trace 618 indicates the XRD pattern of the metal ferrite oxygen carrier comprising $CoFe_2O_4$ prior to reduction. As indicated, prior to reduction, trace 618 indicates the presence of $CoFe_2O_4$ (main) and $Fe_2O_3$, as evidenced by the peaks on trace 618 located at the 2-theta markers generally indicated by $CoFe_2O_4$ and $Fe_2O_3$. Trace 619 indicates the XRD pattern of the metal ferrite oxygen carrier comprising $CoFe_2O_4$ following reduction. Trace 619 indicates the presence of Co, $CoFe_{15.7}$, and $Fe_3O_4$ as evidenced by the peaks on trace 619 located at the 2-theta markers generally indicated by Co, $CoFe_{15.7}$, and $Fe_3O_4$. FIG. 6 thus illustrates a metal ferrite oxygen carrier $MFe_xO_y$, where M is Co, reduced to a reduced carrier comprising an M component (Co and $CoFe_{15.7}$) and an $Fe_cO_d$ component ($Fe_3O_4$), where the M component comprises some portion of the M comprising the $MFe_xO_y$, and where c>0 and d≥0.

Figure 7:
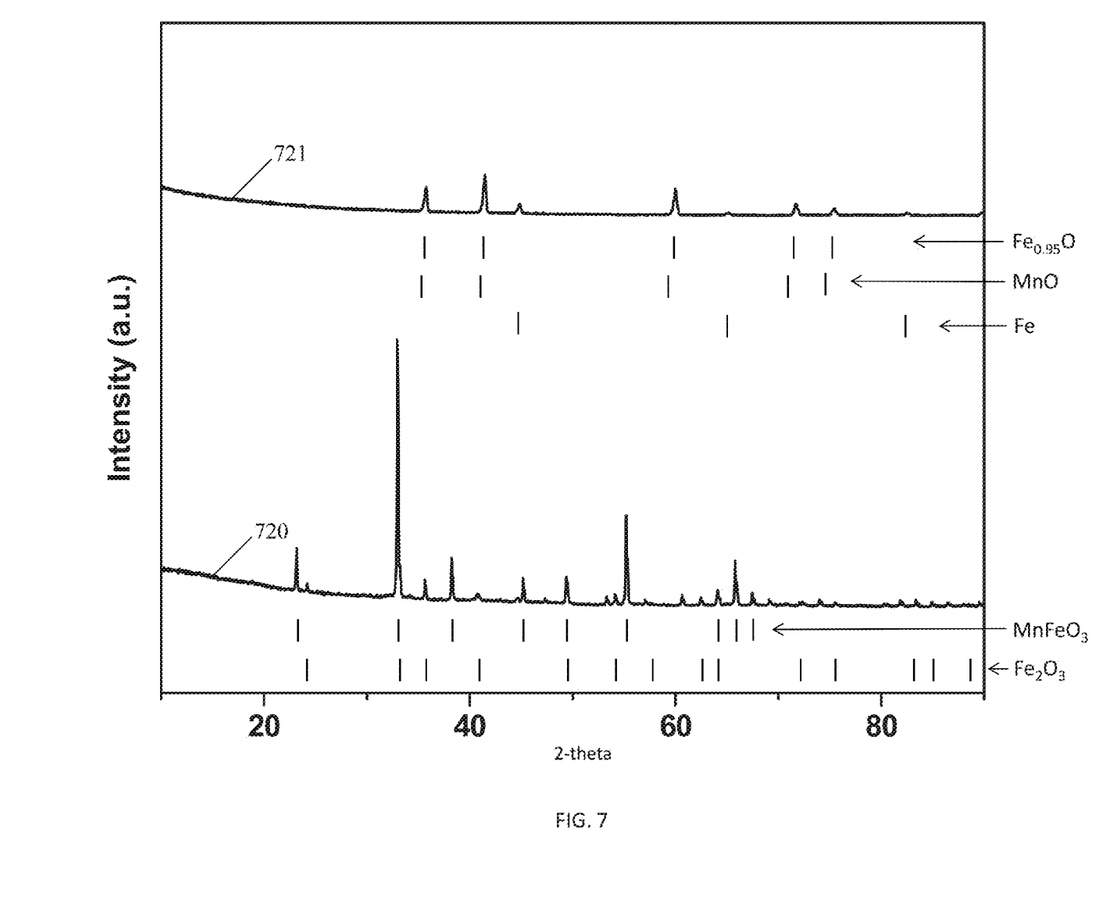
FIG. 7 illustrates XRD results for a metal ferrite oxygen carrier comprising $MnFeO_3$.

FIG. 7 illustrates x-ray diffraction (XRD) patterns obtained before and following reduction of the $BaFe_2O_4$ metal ferrite oxygen carrier. Trace 720 indicates the XRD pattern of the metal ferrite oxygen carrier comprising $MnFeO_3$ prior to reduction. As indicated, prior to reduction, trace 720 indicates the presence of $MnFeO_3$ (main) and $Fe_2O_3$, as evidenced by the peaks on trace 720 located at the 2-theta markers generally indicated by $MnFeO_3$ and $Fe_2O_3$. Trace 721 indicates the XRD pattern of the metal ferrite oxygen carrier comprising $MnFeO_3$ following reduction. Trace 721 indicates the presence of Fe, $Fe_{0.95}O$, and MnO as evidenced by the peaks on trace 721 located at the 2-theta markers generally indicated by Fe, $Fe_{0.95}O$, and MnO. FIG. 7 thus illustrates a metal ferrite oxygen carrier $MFe_xO_y$, where M is Mn, reduced to a reduced carrier comprising an M component (MnO) and an $Fe_cO_d$ component as $FeO_t$ (Fe and $Fe_{0.95}O$), where the M component comprises some portion of the M comprising the $MFe_xO_y$, and where 0≤t≤1.5.

Figure 8:
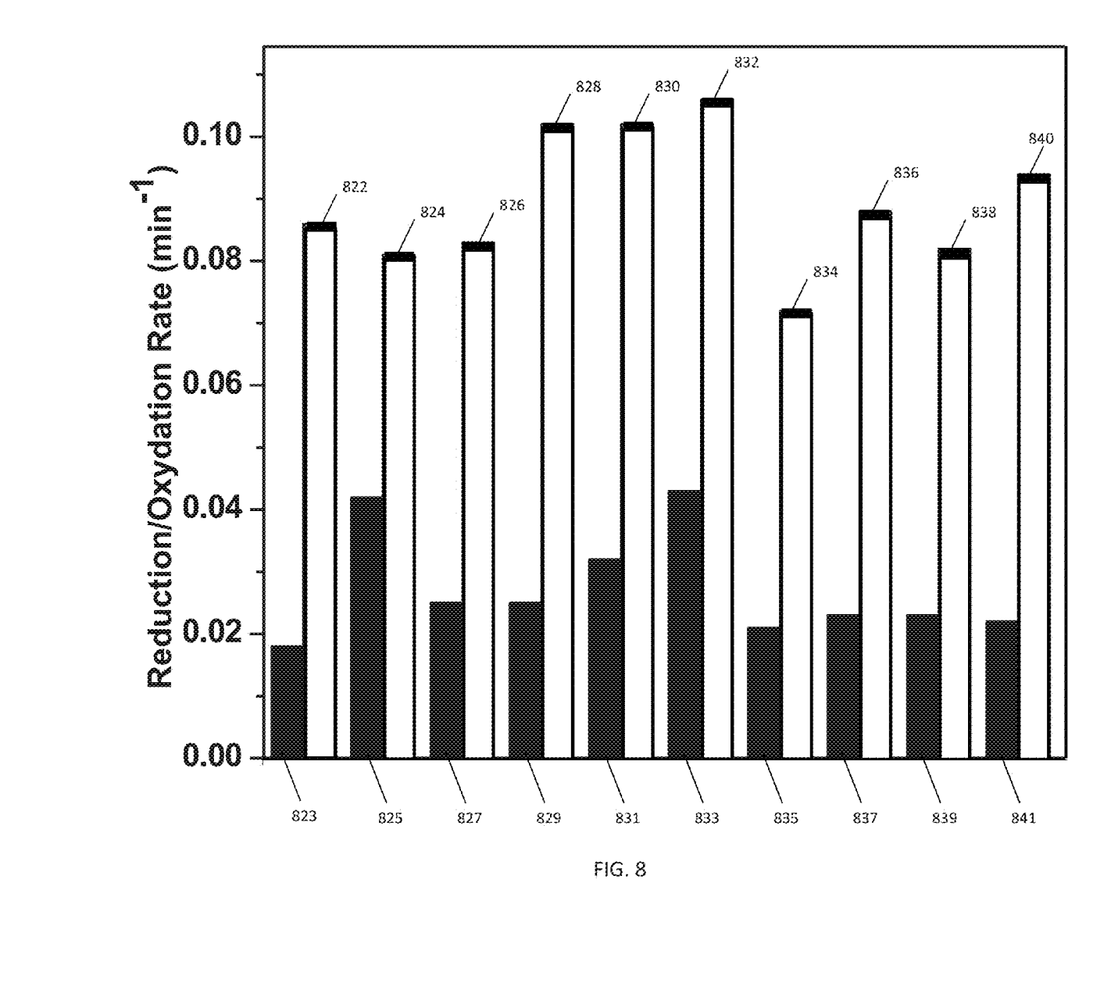
FIG. 8 illustrates the reduction and oxidation rates of the metal ferrite oxygen carriers.

Comparison of reduction and oxidation rates are illustrated at FIG. 8 for the metal ferrite oxygen carriers comprising $MgFe_2O_4$, $CaFe_2O_4$, $SrFe_2O_4$, $BaFe_2O_4$, $CoFe_2O_4$, and $MnFeO_3$ on an inert support of $Al_2O_3$, along with the reduction and oxidation rates for $Fe_2O_3$, CuO, $CuFe_2O_4$, and $NiFe2O4$ for comparison. The reduction and oxidation rates were obtained by TGA conducted in a thermogravimetric analyzer (Cahn Thermax 500) to investigate the redox properties of the metal ferrite oxygen carriers. Approximately 1000 mg of metal ferrite sample mixed with coal or carbon black was placed in a Quartz bucket equipped with Cahn Thermax 500. The mixture was heated in a quartz-bowl to 900 or 1000° C. at a heating rate of 5° C./min in $N_2$ gas and a flow rate of 150 sccm. The sample was then maintained isothermal for the duration of the redox cycles. The reduction cycle generally consisted of 100% nitrogen at 150 sccm while the oxidation cycle generally consisted of air at 150 sccm.

FIG. 8 illustrates reduction rates as $Fe_2O_3$ reduction rate 823, CuO reduction rate 825, $MgFe_2O_4$ reduction rate 827, $CaFe_2O_4$ reduction rate 829, $SrFe_2O_4$ reduction rate 831, $BaFe_2O_4$ reduction rate 833, $CuFe_2O_4$ reduction rate 835, $CoFe_2O_4$ reduction rate 837, $NiFe_2O_4$ reduction rate 837, and $MnFeO_3$ reduction rate 841 As illustrated, $MgFe_2O_4$ reduction rate 827, $CaFe_2O_4$ reduction rate 829, $SrFe_2O_4$ reduction rate 831, $BaFe_2O_4$ reduction rate 833, $CoFe_2O_4$ reduction rate 837, and $MnFeO_3$ reduction rate 841 display improved reduction rates over $Fe_2O_3$ reduction rate 823, and reduction rates which exceed or are comparable with $CuFe_2O_4$ reduction rate 835 and $NiFe_2O_4$ reduction rate 837. Similarly, FIG. 8 illustrates oxidation rates as $Fe_2O_3$ oxidation rate 822, CuO oxidation rate 824, $MgFe_2O_4$ oxidation rate 826, $CaFe_2O_4$ oxidation rate 828, $SrFe_2O_4$ oxidation rate 830, $BaFe_2O_4$ oxidation rate 832, $CuFe_2O_4$ oxidation rate 834, $CoFe_2O_4$ oxidation rate 836, $NiFe_2O_4$ oxidation rate 838, and $MnFeO_3$ oxidation rate 840. As indicated, $MgFe_2O_4$ oxidation rate 826, $CaFe_2O_4$ oxidation rate 828, $SrFe_2O_4$ oxidation rate 830, $BaFe_2O_4$ oxidation rate 832, $CoFe_2O_4$ oxidation rate 836, and $MnFeO_3$ oxidation rate 840 display improved oxidation rates over CuO oxidation rate 824. Additionally, Group II metal ferrites $MgFe_2O_4$, $CaFe_2O_4$, $SrFe_2O_4$, and $BaFe_2O_4$ display improved reduction and oxidation rates over the transition metal ferrites $CuFe_2O_4$, $CoFe_2O_4$, $NiFe_2O_4$, and $MnFeO_3$. In particular, the metal ferrite oxygen carrier comprising $BaFe_2O_4$ displays the best reduction and oxidation rates among the metal ferrite oxygen carriers of this disclosure, and provides a reduction rate comparable to that of CuO. Additionally, the metal ferrite oxygen carrier comprising $BaFe_2O_4$ may be operated up to 1000° C. without agglomeration.

Figure 9:
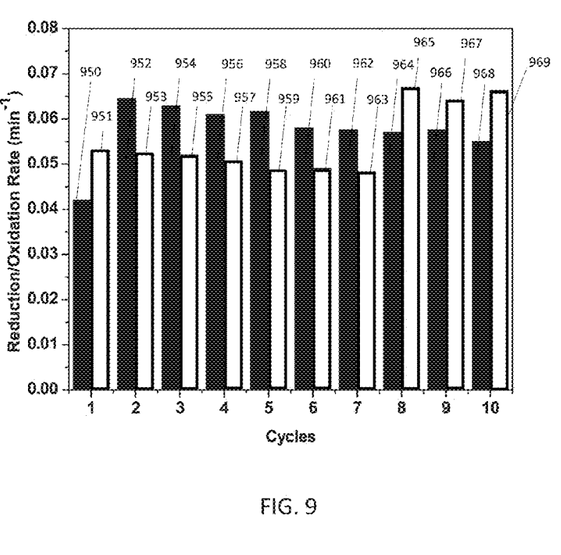
FIG. 9 illustrates the reduction and oxidation rates of a metal ferrite oxygen carrier over multiple cycles.
Figure 10:
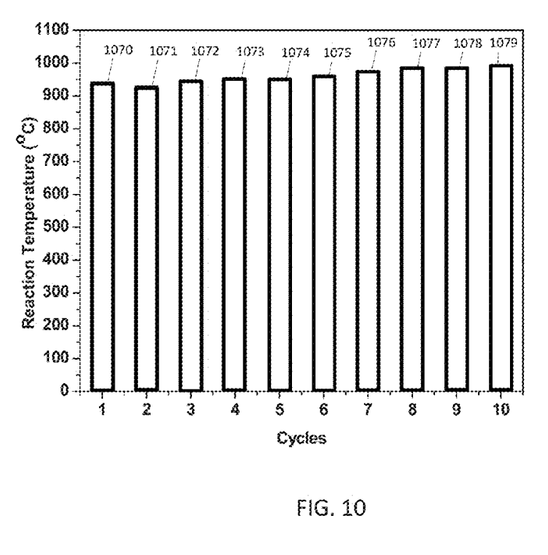
FIG. 10 illustrates the reduction temperatures of a metal ferrite oxygen carrier over multiple cycles.

FIG. 9 illustrates the TGA test data during cyclic tests of carbon CLC with 10% $Al_2O_3/BaFe_2O_4$ synthesized by microwave method. $BaFe_2O_4$ showed stable reduction rates during cyclic tests while oxidation rates improved. The reaction temperature slightly increased with increasing cycles. At FIG. 9, reduction rates 952, 954, 956, 958, 960, 962, 964, 966, and 968 correspond to cycles 1, 2, 3, 4, 5, 6, 7, 8, 9, and 10 respectively, while oxidation rates 953, 955, 957, 959, 961, 963, 965, 967, and 969 correspond to cycles 1, 2, 3, 4, 5, 6, 7, 8, 9, and 10 respectively. FIG. 10 illustrates reduction temperatures for the cycles 1, 2, 3, 4, 5, 6, 7, 8, 9, and 10 as reduction temperatures 1070, 1071, 1072, 1073, 1074, 1075, 1076, 1077, 1078, and 1079 respectively.

In an embodiment, the metal ferrite oxygen carriers of this disclosure are synthesized using a microwave method. In microwave (Anton Paar Synthos 3000) method, metal nitrates or metal acetate were used as precursor of oxygen carriers. Metal nitrates or metal acetates were dissolved in the diethylene glycol and the solution was heated up to 200° C.-250° C. in the microwave reactor for 30-45 min. The resulting solid precipitate was washed with DI water and separated by centrifugation. The material was dried in an oven at 100° C. overnight and calcined in air at 600-1000° C. for 6 h.

In another embodiment, the metal ferrite oxygen carriers of this disclosure are synthesized using a solid reaction method. Solid Reaction Method was evaluated as a preparation method since it is a more cost effective than microwave method. In Solid Reaction method, metal nitrates were mixed with citric acid to enhance bonding and prevent aggregation at high temperature. The mixture was heated to 1000° C. at a ramping rate of 3° C./min in air and kept at 1000° C. for 6 h.

Thus, the disclosure provides a metal ferrite oxygen carrier having improved durability and reactivity over metal oxides currently used in the chemical looping combustion of solid carbonaceous fuels, such as coal, coke, coal and biomass char, and the like. The metal ferrite oxygen carrier comprises $MFe_xO_y$ on an inert support, where $MFe_xO_y$ is a chemical composition and M is one of Mg, Ca, Sr, Ba, Co, Mn, and combinations thereof. The metal ferrite oxygen carrier thereby comprises a metal ferrite ($MFe_2O_4$) with M selected from Group II elements Mg, Ca, Sr, and Ba and transition metal ferrites $CoFe_2O_4$ and $MnFeO_3$. The metal ferrite oxygen carriers disclosed display improved reduction rates over $Fe_2O_3$, and improved oxidation rates over CuO. Additionally, Group II metal ferrites $MgFe_2O_4$, $CaFe_2O_4$, $SrFe_2O_4$, and $BaFe_2O_4$ display improved reduction and oxidation rates over the transition metal ferrites $CuFe_2O_4$, $CoFe_2O_4$, $NiFe_2O_4$, and $MnFeO_3$.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of combusting a solid carbonaceous fuel comprising:
    delivering a metal ferrite oxygen carrier to a fuel reactor, where the metal ferrite oxygen carrier comprises $MFe_xO_y$ on an inert support, where M comprises;
    mixing the solid carbonaceous fuel and the metal ferrite oxygen carrier in the fuel reactor generating a reduced carrier, where the reduced carrier comprises an M component and an $Fe_cO_d$ component where $c>0$ and $d>0$, where the M component comprises some portion of the M comprising the $MFe_xO_y$, where $1.5 \leq x \leq 2.5$ and $3.5 \leq y \leq 4.5$, further where the M component comprises Ba and where the $Fe_cO_d$ component comprises some portion of the Fe comprising the $MFe_xO_y$, where the $Fe_cO_d$ component is $FeO_t$, where $0 \leq t \leq 1.5$, further where $FeO_t$ comprises Fe and maintaining the fuel reactor at a reducing temperature, where the reducing temperature is sufficient to reduce some portion of the metal ferrite oxygen carrier and oxidize some portion of the solid carbonaceous fuel, thereby combusting the solid carbonaceous fuel.

2. The method of claim 1 where the reducing temperature is from 800° C. to 1200° C.

3. The method of claim 2 where the $MFe_xO_y$ is one of $MFe_uO_v$, $MFe_wO_z$, and combinations thereof, and where $1.5 \leq u \leq 2.5$, $3.5 \leq v \leq 4.5$, $1.5 \leq w \leq 2.5$, and $2.5 \leq z \leq 3.5$.

4. The method of claim 2 where the inert support comprises from about 5 wt. % to about 60 wt. % of the metal ferrite oxygen carrier and the $MFe_xO_y$ comprises at least 30 wt. % of the metal ferrite oxygen carrier.

5. The method of claim 4 where $1.5 \leq u \leq 2.5$ and $3.5 \leq v \leq 4.5$.

6. The method of claim 4 where $1.5 \leq w \leq 2.5$, and $2.5 \leq z \leq 3.5$.

7. The method of claim 4 where the inert support comprises alumina.

8. The method of claim 1 further comprising injecting a gasification agent into the fuel reactor.

9. The method of claim 1 further comprising oxidizing the reduced carrier by contacting the reduced carrier and an oxidizing gas at an oxidizing temperature, where the oxidizing gas is comprised of oxygen, and where the oxidizing temperature is sufficient to generate an oxidizing reaction, where the reactants of the oxidizing reaction comprise some portion of the oxygen, some portion of the M component, and some portion of the $Fe_cO_d$ component, and where the product of the oxidizing reaction is a re-oxidized carrier, where the re-oxidized carrier comprises $MFe_aO_b$ on the inert support.

10. The method of claim 9 where the oxidizing temperature is from 800° C. to 1200° C.

11. The method of claim 10 where oxidizing the reduced carrier occurs in an oxidizing reactor, and further comprising:
    transferring the reduced carrier from the fuel reactor to the oxidizing reactor;
    supplying the oxidizing gas to the oxidizing reactor, thereby generating the re-oxidized carrier;
    transferring the re-oxidized carrier from the oxidizing reactor to the fuel reactor, and repeating the delivering step and the contacting step utilizing an additional quantity of the solid carbonaceous fuel as the solid carbonaceous fuel and the re-oxidized carrier as the metal ferrite oxygen carrier.

12. A method of combusting a solid carbonaceous fuel comprising:
    delivering a metal ferrite oxygen carrier to a fuel reactor, where the metal ferrite oxygen carrier comprises $MFe_xO_y$ on an inert support where the inert support comprises from about 5 wt. % to about 60 wt. % of the metal ferrite oxygen carrier, the $MFe_xO_y$ comprises at least 30 wt. % of the metal ferrite oxygen carrier, and where $0.5 \leq x \leq 1.5$ and $2.5 \leq y \leq 3.5$ and where $0.5 \leq a \leq 1.5$ and $2.5 \leq b \leq 3.5$, where M is one of Ba or Mn-and combinations thereof, and where the $MFe_xO_y$ is one of $MFe_uO_v$, $MFe_wO_z$, and combinations thereof, where $1.5 \leq u \leq 2.5$, $3.5 \leq v \leq 4.5$, $1.5 \leq w \leq 2.5$, and $2.5 \leq z \leq 3.5$;
    mixing the solid carbonaceous fuel and the metal ferrite oxygen carrier in the fuel reactor A and maintaining the fuel reactor at a reducing temperature of from 800° C. to 1200° C. and generating a reduced carrier, where the reduced carrier comprises an M component and a $Fe_cO_d$ component, where the M component comprises some portion of the M comprising the $MFe_xO_y$, and where the $Fe_cO_d$ component comprises some portion of the Fe comprising the $MFe_xO_y$, where $c>0$ and $d \geq 0$, thereby combusting the solid carbonaceous fuel;
    transferring the reduced carrier from the fuel reactor to an oxidizing reactor;
    oxidizing the reduced carrier by supplying an oxidizing gas to the oxidizing reactor, where the oxidizing gas is comprised of oxygen, and contacting the reduced carrier and the A oxidizing gas at an oxidizing temperature of from 800° C. to 1200° C. and generating an oxidizing reaction, where the reactants of the oxidizing reaction comprise some portion of the oxygen, some portion of the M component, and some portion of the $Fe_cO_d$ component, and where the product of the oxidizing reaction is a re-oxidized carrier, where the re-oxidized carrier comprises $MFe_aO_b$ on the inert support; and
    transporting the re-oxidized carrier from the oxidizing reactor to the fuel reactor; and repeating the delivering step, the contacting step, the transferring step, and the oxidizing step utilizing an additional quantity of the solid carbonaceous fuel as the solid carbonaceous fuel and the re-oxidized carrier as the metal ferrite oxygen carrier.

13. A method of combusting a solid carbonaceous fuel comprising:
    delivering a metal ferrite oxygen carrier to a fuel reactor, where the metal ferrite oxygen carrier comprises $MFe_xO_y$ on an inert support, where M is Mn;
    mixing the solid carbonaceous fuel and the metal ferrite oxygen carrier in the fuel reactor generates a reduced carrier, where the reduced carrier comprises an M component and an $Fe_cO_d$ component, where the M component comprises some portion of the M comprising the $MFe_xO_y$, and where the $Fe_cO_d$ component comprises some portion of the Fe comprising the $MFe_xO_y$, where c>0 and d≥0;

oxidizing the reduced carrier by contacting the reduced carrier and an oxidizing gas at an oxidizing temperature, where the oxidizing gas is comprised of oxygen, and where the oxidizing A temperature is from 800° C. to 1200° C., sufficient to generate an oxidizing reaction, where the reactants of the oxidizing reaction comprise some portion of the oxygen, some portion of the M component, and some portion of the $Fe_cO_d$ component, and where the product of the oxidizing reaction is a re-oxidized carrier, where the re-oxidized carrier comprises $MFe_aO_b$ on the inert support, where 0.5≤x≤1.5 and 2.5≤y≤3.5 and where 0.5≤a≤1.5 and 2.5≤b≤3.5; and maintaining the fuel reactor at a reducing temperature, where the reducing temperature is sufficient to reduce some portion of the metal ferrite oxygen carrier and oxidize some portion of the solid carbonaceous fuel, thereby combusting the solid carbonaceous fuel.

14. The method of claim 13 where oxidizing the reduced carrier occurs in an oxidizing reactor, and further comprising:

transferring the reduced carrier from the fuel reactor to the oxidizing reactor;

supplying the oxidizing gas to the oxidizing reactor, thereby generating the re-oxidized carrier;

transferring the re-oxidized carrier from the oxidizing reactor to the fuel reactor; and repeating the delivering step and the contacting step utilizing an additional quantity of the solid carbonaceous fuel as the solid carbonaceous fuel and the re-oxidized carrier as the metal ferrite oxygen carrier.

* * * * *